United States Patent
Xu et al.

(10) Patent No.: US 9,535,928 B2
(45) Date of Patent: Jan. 3, 2017

(54) COMBINING INFORMATION OF DIFFERENT LEVELS FOR CONTENT-BASED RETRIEVAL OF DIGITAL PATHOLOGY IMAGES

(71) Applicant: SONY CORPORATION, Tokyo (JP)

(72) Inventors: Xun Xu, Palo Alto, CA (US); Shengyang Dai, San Jose, CA (US); Akira Nakamura, San Jose, CA (US); Su Wang, San Jose, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/212,827

(22) Filed: Mar. 14, 2014

(65) Prior Publication Data

US 2014/0270432 A1    Sep. 18, 2014

Related U.S. Application Data

(60) Provisional application No. 61/793,831, filed on Mar. 15, 2013.

(51) Int. Cl.
*G06K 9/46* (2006.01)
*G06F 17/30* (2006.01)

(52) U.S. Cl.
CPC ....... *G06F 17/30247* (2013.01); *G06K 9/4652* (2013.01); *G06K 9/4671* (2013.01)

(58) Field of Classification Search
None
See application file for complete search history.

(56) References Cited

U.S. PATENT DOCUMENTS

| | | | |
|---|---|---|---|
| 6,466,687 B1 * | 10/2002 | Uppaluri | G06T 7/0012 382/128 |
| 7,272,593 B1 | 9/2007 | Castelli et al. | |
| 7,483,554 B2 * | 1/2009 | Kotsianti | G06K 9/00127 382/128 |
| 7,761,240 B2 | 7/2010 | Saidi et al. | |
| 7,949,181 B2 | 5/2011 | Padfield et al. | |
| 8,077,959 B2 | 12/2011 | Dekel et al. | |
| 2006/0127880 A1 * | 6/2006 | Harris | G06K 9/00127 435/4 |

(Continued)

OTHER PUBLICATIONS

Esgiar, A. Nasser, Raouf NG Naguib, Bayan S. Sharif, Mark K. Bennett, and Alan Murray. "Microscopic image analysis for quantitative measurement and feature identification of normal and cancerous colonic mucosa." Information Technology in Biomedicine, IEEE Transactions on 2, No. 3 (1998): 197-203.*

(Continued)

*Primary Examiner* — Sumati Lefkowitz
*Assistant Examiner* — Carol Wang
(74) *Attorney, Agent, or Firm* — Haverstock & Owens LLP

(57) ABSTRACT

Content-based retrieval of digital pathology images (DPI) is a fundamental component in an intelligent DPI processing and management system. One key issue of content-based DPI retrieval is how to represent an image as a feature vector, capturing its key information that is most relevant to the goal of retrieval. A unified framework of extracting information of different levels for DPI, namely low level color information, middle level texture information and high level diagnostic information is described herein. Such information from all the levels are integrated to the end of content-based DPI retrieval.

24 Claims, 2 Drawing Sheets

(56) References Cited

U.S. PATENT DOCUMENTS

| | | | |
|---|---|---|---|
| 2006/0274917 A1* | 12/2006 | Ng | G06K 9/00785 382/103 |
| 2009/0257640 A1* | 10/2009 | Gossage et al. | 382/133 |
| 2010/0098306 A1 | 4/2010 | Madabhushi et al. | |
| 2010/0111396 A1* | 5/2010 | Boucheron | G06K 9/0014 382/133 |
| 2014/0233826 A1* | 8/2014 | Agaian | A61B 5/7267 382/133 |

OTHER PUBLICATIONS

Malik, Jitendra, Serge Belongie, Jianbo Shi, and Thomas Leung. "Textons, contours and regions: Cue integration in image segmentation." In Computer Vision, 1999. The Proceedings of the Seventh IEEE International Conference on, vol. 2, pp. 918-925. IEEE, 1999.*

Wu, Chung-Ming, Yung-Chang Chen, and Kai-Sheng Hsieh. "Texture features for classification of ultrasonic liver images." Medical Imaging, IEEE Transactions on 11, No. 2 (1992): 141-152.*

Sertel, Olcay, Jun Kong, Umit V. Catalyurek, Gerard Lozanski, Joel H. Saltz, and Metin N. Gurcan. "Histopathological image analysis using model-based intermediate representations and color texture: Follicular lymphoma grading." Journal of Signal Processing Systems 55, No. 1-3 (2009): 169-183.*

Rampun, Andrik, Harry Strange, and Reyer Zwiggelaar. "Texture segmentation using different orientations of GLCM features." In Proceedings of the 6th International Conference on Computer Vision/Computer Graphics Collaboration Techniques and Applications, p. 17. ACM, 2013.* de Siqueira, Fernando Roberti, William Robson Schwartz, and Helio Pedrini. "Multi-scale gray level co-occurrence matrices for texture description." Neurocomputing 120 (2013): 336-345.*

Kurmyshev, Evguenii V., Marian Poterasu, and Jose T. Guillen-Bonilla. "Image scale determination for optimal texture classification using coordinated clusters representation." Applied optics 46, No. 9 (2007): 1467-1476.*

Anca Loredana Ion "Rough Sets and Gaussian Mixture Model in Medical Image Diagnosis", 2011. Annals of the University of Craiova, Mathematics and Computer Science Series, vol. 38(4), pp. 50-62. retrieved on [Jul. 17, 2014]. Retrieved from the internet: <URL: http://inf.ucv.ro/~ami/index.php/ami/article/view/429/392> entire document.

Biagetti et al "Unsupervised Identification of Nonstationary Dynamical Systems Using a Gaussian Mixture Model Based on EM Clustering of SOMs", 2010 IEEE. DIBET—Department of Biomedical Engineering, Electronics and Telecommunications Universit'a Politecnica delle Marche. Ancona, Italy. Retrieved on [Jul. 17, 2014]. Retrieved from the internet: <URL: http://ieeexplore.ieee.org/xpl/login.jsp?tp=&arnumber=5537836&url=http%3A%2F%2Fieeexplore.ieee.org%2Fiel5%2F5512009%2F5536941%2F05537836.pdf%3Farnumber%3D5537836> entire document.

Dimitris K. Iakovidis et al., "A Pattern Similarity Scheme for Medical Image Retrieval", IEEE Transactions on Information Technology in Biomedicine, vol. 13, No. 4, Jul. 2009, pp. 442-450.

* cited by examiner

COMBINING INFORMATION OF DIFFERENT LEVELS FOR CONTENT-BASED RETRIEVAL OF DIGITAL PATHOLOGY IMAGES

CROSS-REFERENCE TO RELATED APPLICATION

This application claims the benefit of U.S. Provisional Patent Application Ser. No. 61/793,831, filed on Mar. 15, 2013, and titled "COMBINING INFORMATION OF DIFFERENT LEVELS FOR CONTENT-BASED RETRIEVAL OF DIGITAL PATHOLOGY IMAGES" which is hereby incorporated by reference in its entirety for all purposes.

FIELD OF THE INVENTION

The present invention relates to the field of digital pathology imaging. More specifically, the present invention relates to content-based retrieval of digital pathology images.

BACKGROUND OF THE INVENTION

Digital Pathology is an image-based information environment enabled by computer technology that allows for the management of information generated from a digital slide. Digital pathology is enabled in part by virtual microscopy, which is the practice of converting glass slides into digital slides that can be viewed, managed and analyzed.

SUMMARY OF THE INVENTION

Content-based retrieval of digital pathology images (DPI) is a fundamental component in an intelligent DPI processing and management system. One key issue of content-based DPI retrieval is how to represent an image as a feature vector, capturing its key information that is most relevant to the goal of retrieval. A unified framework of extracting information of different levels for DPI, namely low level color information, middle level texture information and high level diagnostic information is described herein. Such information from all the levels are integrated to the end of content-based DPI retrieval.

In one aspect, a method of extracting a feature of an image programmed in a memory of a device comprises receiving a pathology image, performing a plurality of modes of quantization on the pathology image, extracting features from quantization maps of the pathology image and generating a feature vector of the pathology image. The pathology image is quantized into a group of quantization maps corresponding to different quantization modules. Each element of the quantization map comprises a quantization label of a corresponding pixel in the pathology image. The plurality of modes of quantization include color quantization, texture quantization and diagnostic quantization. The color quantization is implemented by first learning a Gaussian Mixture Model (GMM) from all pixels in a set of training images, then, based on the GMM, mapping each pixel in the pathology image to a Gaussian kernel label to which a color of the pixel has maximum posterior probability. The texture quantization is implemented by transforming each pixel of the pathology image into a filter response vector by filtering the pathology image with a set of predefined filters and quantizing the filter response vector against the GMM, which was learned from filter response vectors computed on the set of training images. The diagnostic quantization is implemented by assigning a label indicating a most probable cancer stage to each pixel in the pathology image using an automatic cancer grading analysis system. The quantization maps are converted into feature vectors by aggregating the quantization labels. One part of the of such aggregated feature vector is a histogram of the labels. The other part comprises multiple co-occurrence feature vectors, deduced from co-occurrence matrices computed at multiple scales. A pyramid of images of different resolutions are generated from the input pathology image, and the feature extraction procedure described above is repeated at each resolution, the final feature vector is the concatenation of feature vectors computed at all resolutions.

In another aspect, a system programmed in a memory of a device comprises a mode module configured for performing a plurality of modes of quantization on a pathology image, an extraction module configured for extracting features from quantization maps of the pathology image and a generation module configured for generating a feature vector of the pathology image. The pathology image is quantized into a group of quantization maps corresponding to different quantization modules. Each element of the quantization map comprises a quantization label of a corresponding pixel in the pathology image. The plurality of modes of quantization include color quantization, texture quantization and diagnostic quantization. The color quantization is implemented by first learning a Gaussian Mixture Model (GMM) from all pixels in a set of training images, then, based on the GMM, mapping each pixel in the pathology image to a Gaussian kernel label to which a color of the pixel has maximum posterior probability. The texture quantization is implemented by transforming each pixel of the pathology image into a filter response vector by filtering the pathology image with a set of predefined filters and quantizing the filter response vector against the GMM, which was learned from filter response vectors computed on the set of training images. The diagnostic quantization is implemented by assigning a label indicating a most probable cancer stage to each pixel in the pathology image using an automatic cancer grading analysis system. The quantization maps are converted into feature vectors by aggregating the quantization labels. One part of the of such aggregated feature vector is a histogram of the labels. The other part comprises multiple co-occurrence feature vectors, deduced from co-occurrence matrices computed at multiple scales. A pyramid of images of different resolutions are generated from the input pathology image, and the feature extraction procedure described above is repeated at each resolution, the final feature vector is the concatenation of feature vectors computed at all resolutions.

In another aspect, an apparatus comprises a non-transitory memory for storing an application, the application for: receiving a pathology image, performing a plurality of modes of quantization on the pathology image, extracting features from quantization maps of the pathology image and generating a feature vector of the pathology image and a processing component coupled to the memory, the processing component configured for processing the application. The pathology image is quantized into a group of quantization maps corresponding to different quantization modules. Each element of the quantization map comprises a quantization label of a corresponding pixel in the pathology image. The plurality of modes of quantization include color quantization, texture quantization and diagnostic quantization. The color quantization is implemented by first learning a Gaussian Mixture Model (GMM) from all pixels in a set of training images, then, based on the GMM, mapping each pixel in the pathology image to a Gaussian kernel label to which a color of the pixel has maximum posterior probability. The texture quantization is implemented by transforming each pixel of the pathology image into a filter response vector by filtering the pathology image with a set of predefined filters and quantizing the filter response vector against the GMM, which was learned from filter response vectors computed on the set of training images. The diagnostic quantization is implemented by assigning a label indicating a most probable cancer stage to each pixel in the pathology image using an automatic cancer grading analysis system. The quantization maps are converted into feature vectors by aggregating the quantization labels. One part of the of such aggregated feature vector is a histogram of the labels. The other part comprises multiple co-occurrence feature vectors, deduced from co-occurrence matrices computed at multiple scales. A pyramid of images of different resolutions are generated from the input pathology image, and the feature extraction procedure described above is repeated at each resolution, the final feature vector is the concatenation of feature vectors computed at all resolutions.

DETAILED DESCRIPTION OF THE PREFERRED EMBODIMENT

Figure 1:
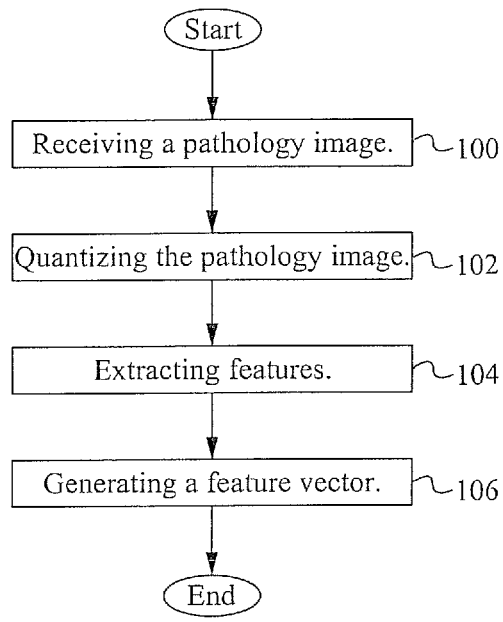
FIG. 1 illustrates a flowchart of an overall feature extraction framework for content-based DPI retrieval according to some embodiments.

Content-based retrieval of digital pathology images (DPI) is a fundamental component in an intelligent DPI processing and management system. One key issue of content-based DPI retrieval is how to represent an image as a feature vector, capturing its key information that is most relevant to the goal of retrieval.

A unified framework of extracting information of different levels for DPI, namely low level color information, middle level texture information and high level diagnostic information is described herein. Such information from all the levels are integrated to the end of content-based DPI retrieval.

Pathology images contain a significant amount of information to be encoded. Some are associated with low to middle levels of visual perception, such as color and texture; some are relevant to high level domain knowledge, such as diagnostic information specific to an application. Integrating all such relevant information is crucial for a successful content-based DPI retrieval system.

A unified framework to extract and integrate different features from pathology images is described herein. Under this framework heterogeneous features coming from different levels are able to be extracted in a similar way and easily integrated together to be used for content-based retrieval.

Quantization

In the framework described herein, analysis modules specialized for heterogeneous features represent the input image in a unified format, e.g., the quantization map (Q-Map). Q-Map is an integer array of the same size as the input image, each element of the Q-Map is a quantization label of the corresponding pixel in the input image. How each pixel is quantized depends on the specific analysis module as described herein.

Color Quantizer

Color is a representative low level image information. To quantize color information, a Gaussian Mixture Model (GMM) is learned on a set of training pathology images. Then, based on this GMM, each pixel in the input image is mapped to the Gaussian kernel label to which its color has maximal posterior probability.

Texture Quantizer

Texture information lies at the middle level of the visual perception system. To quantize texture information, a texton approach is employed. An example of the texton approach is described further in Malik, Jitendra et al., "Textons, Contours and Regions: Cue Integration in Image Segmentation." s.i.: IEEE Computer Society, 1999, Proceedings of the International Conference on Computer Vision, Corfu, Greece, which is hereby incorporated by reference in its entirety. The input image is filtered with a set of predefined filters, hence each pixel is transformed to a filter response vector. The vector is then quantized against a GMM, learned based on such response vectors obtained from the training images.

Diagnostic Quantizer

Quantization of diagnostic information is largely dependent on a specific application. In one example, the relevant diagnosis task is cancer grading. Using an automatic cancer grading analysis system, each pixel in the input image is assigned a label indicating the most probable cancer stage (or being healthy) at that location.

Feature Extraction on Quantization Map

Once there are Q-Maps encoding information from different analysis modules, feature vectors are extracted to compactly encode such information. Several different ways are employed to do that and aggregate them into the final feature vector.

Histogram

A histogram is a way to convert a Q-Map into a compact vector. The histogram feature vector simply includes the probability of each quantization label over the whole Q-Map. The histogram is global and does not contain any spatial information, but is robust to image noises.

Co-occurrence Features

A spatial co-occurrence matrix, also referred to as Gray-Level Co-occurrence Matrices (GLCM), is a distribution of co-occurring values at a given offset over an image. The co-occurrence matrix is applicable to any integer array, such as the Q-Map.

The co-occurrence matrix itself is not compact (for N-labels it will be N×N) and prone to image noise. In practice it is rarely directly used. Instead, more compact and robust feature vectors are derived from the co-occurrence matrix. The co-occurrence feature vector used herein includes both a Color Auto-Correlogram (CAC) and a Markov Stationary Feature (MSF).

The co-occurrence feature vector preserves important spatial information in pathology images; meanwhile, it is invariant to rotation and translation. This is a desired property, as it makes the feature vector robust to geometric variations induced in the DPI formation procedure, such as scanning and cropping.

Multi-resolution and Multi-scale Feature Extraction

Physiological research on the human vision system suggests that image information of different resolutions are aggregated in the process of visual perception. The framework described herein is able to easily accommodate multi-resolution feature extraction. An image pyramid is built from every image to be processed, then each image in the pyramid is able to be independently processed through the procedures shown in FIGS. 1 and 2, resulting in a feature vector for a certain resolution.

During the computation of the co-occurrence feature, an offset distance parameter is used to decide the scale at which the pixel correlation is analyzed. The co-occurrence feature vector is computed at different scales.

The final feature vector is the concatenation of feature vectors computed at different resolutions and scales, being a multi-resolution and multi-scale feature vector.

Figure 2:
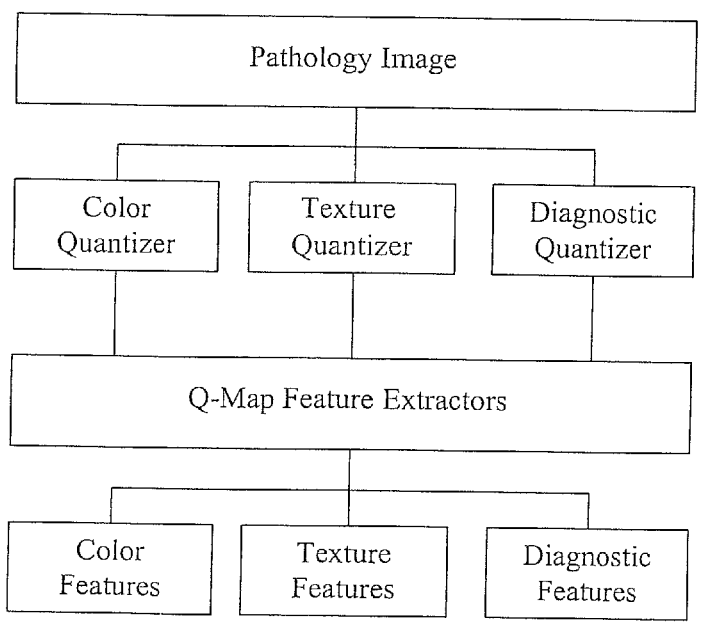
FIG. 2 illustrates a diagram of a method of combining information of different levels for content-based retrieval of digital pathology images according to some embodiments.

FIGS. 1 and 2 illustrate a flowchart and diagram of a method of combining information of different levels for content-based retrieval of digital pathology images according to some embodiments. In the step 100, a pathology image is input or received. In the step 102, quantization of the pathology image is performed. In some embodiments, quantization includes generating a quantization map where the quantization map includes a quantization label of a corresponding pixel in the pathology image. In some embodiments, quantizing the pathology image includes several types or modes of quantization such as color quantization, texture quantization and/or diagnostic quantization, as shown in FIG. 2. Color quantization includes a Gaussian Mixture Model is learned using a set of training images, and each pixel in the pathology image is mapped to a Gaussian kernel label to which a pixel's color has maximum posterior probability. Texture quantization is implemented by transforming each pixel of the pathology image into a filter response vector by filtering the pathology image with a set of predefined filters and quantizing the filter response vector against a Gaussian Mixture Model. Diagnostic quantization is implemented by assigning a label indicating a most probable cancer stage to each pixel in the pathology image using an automatic cancer grading analysis system. In the step 104, features are extracted. In some embodiments, the features include color features, texture features and/or diagnostic features, as shown in FIG. 2. Extracting the features includes compactly encoding the extracted features and aggregating the extracted features into the feature vector. In some embodiments, extracting the features comprises multi-resolution feature extraction. In the step 106, a feature vector is generated. In some embodiments, the feature vector is generated using a histogram. In some embodiments, the feature vector comprises a co-occurrence feature vector computed at different scales. In some embodiments, a final feature vector is computed by concatenation of feature vectors computed at different resolutions and scales. In some embodiments, fewer or additional steps are implemented. In some embodiments, the order of the steps is modified.

Figure 3:
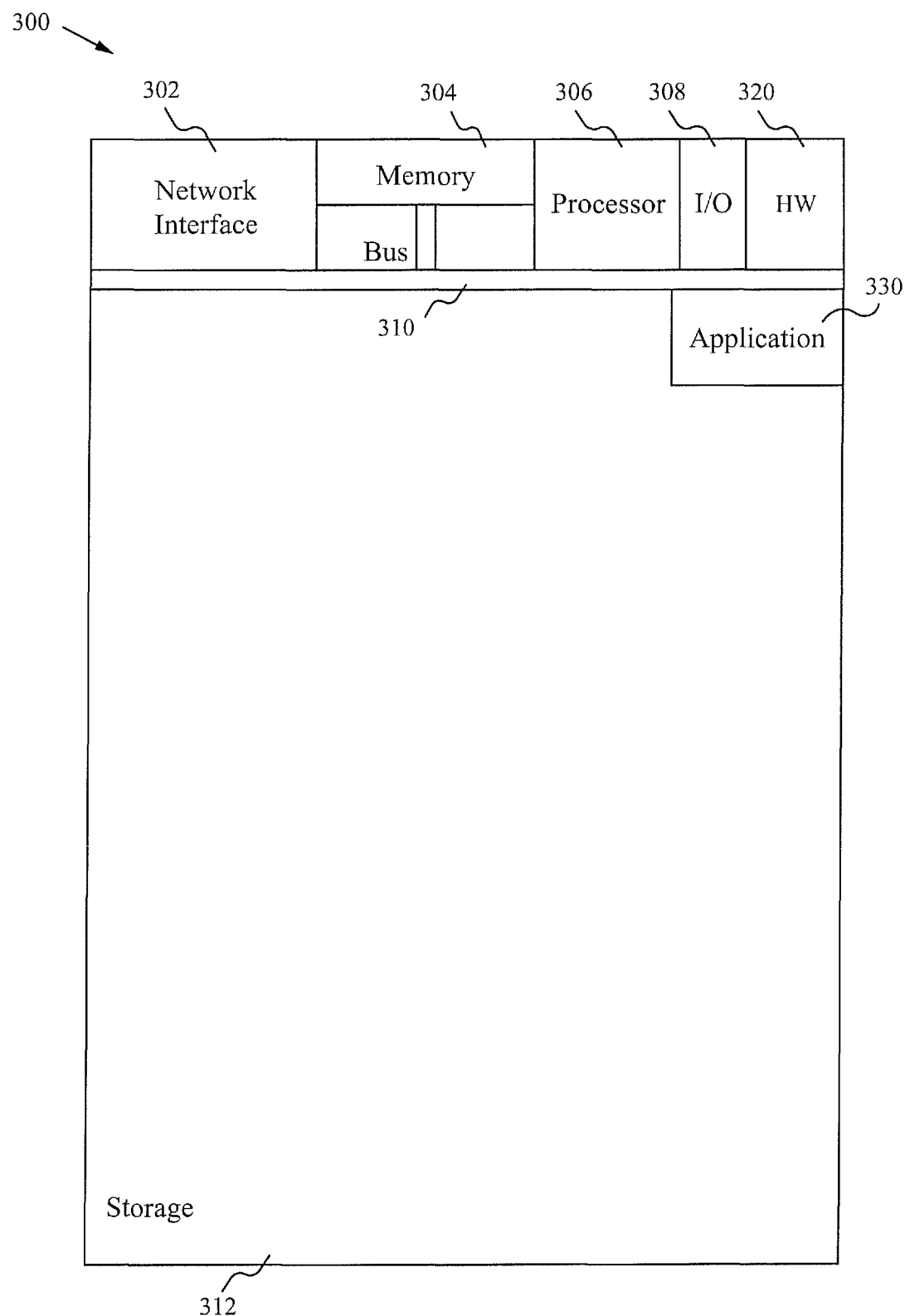
FIG. 3 illustrates a block diagram of an exemplary computing device configured to implement the content-based retrieval method according to some embodiments.

FIG. 3 illustrates a block diagram of an exemplary computing device configured to implement the pathology image feature extraction method for content-based retrieval method according to some embodiments. The computing device 300 is able to be used to acquire, store, compute, process, communicate and/or display information such as text, images and videos. In general, a hardware structure suitable for implementing the computing device 300 includes a network interface 302, a memory 304, a processor 306, I/O device(s) 308, a bus 310 and a storage device 312. The choice of processor is not critical as long as a suitable processor with sufficient speed is chosen. The memory 304 is able to be any conventional computer memory known in the art. The storage device 312 is able to include a hard drive, CDROM, CDRW, DVD, DVDRW, Blu-ray®, flash memory card or any other storage device. The computing device 300 is able to include one or more network interfaces 302. An example of a network interface includes a network card connected to an Ethernet or other type of LAN. The I/O device(s) 308 are able to include one or more of the following: keyboard, mouse, monitor, screen, printer, modem, touchscreen, button interface and other devices. Pathology image feature extraction method for content-based retrieval application(s) 330 used to perform the pathology image feature extraction method for content-based retrieval method are likely to be stored in the storage device 312 and memory 304 and processed as applications are typically processed. More or less components shown in FIG. 3 are able to be included in the computing device 300. In some embodiments, pathology image feature extraction method for content-based retrieval hardware 320 is included. Although the computing device 300 in FIG. 3 includes applications 330 and hardware 320 for the pathology image feature extraction method for content-based retrieval method, the pathology image feature extraction method for content-based retrieval method is able to be implemented on a computing device in hardware, firmware, software or any combination thereof. For example, in some embodiments, the pathology image feature extraction method for content-based retrieval applications 330 are programmed in a memory and executed using a processor. In another example, in some embodiments, the pathology image feature extraction method for content-based retrieval hardware 320 is programmed hardware logic including gates specifically designed to implement the pathology image feature extraction method for content-based retrieval method.

In some embodiments, the pathology image feature extraction method for content-based retrieval application(s) 330 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, Blu-ray® writer/player), a television, a home entertainment system or any other suitable computing device.

To utilize the pathology image feature extraction method for content-based retrieval method an image is input, the image is quantized using multiple types of quantization such as color, texture and diagnostic quantization, features are extracted and a feature vector is generated. Each step is able to be performed automatically, manually or a combination thereof. The feature vector is able to be used to generate search or comparison results.

In operation, the pathology image feature extraction method for content-based retrieval method provides a unified way to extract heterogeneous features associated with different levels of visual perception. The framework is flexible and extensible. It is easy to include new features by providing a specialized quantizer for each new analysis module. The features are invariant to rotation and translation transforms, thus robust to geometric variations of pathology images. Multi-resolution and multi-scale information is able to be extracted.

Some Embodiments of Combining Information of Different Levels for Content-Based Retrieval of Digital Pathology Images 1. A method of extracting a feature of an image programmed in a memory of a device comprising:
   a. receiving a pathology image;
   b. performing a plurality of modes of quantization on the pathology image;
   c. extracting features from quantization maps of the pathology image; and
   d. generating a feature vector of the pathology image.
2. The method of clause 1 wherein the pathology image is quantized into a group of quantization maps corresponding to different quantization modules.
3. The method of clause 2 wherein each element of the quantization map comprises a quantization label of a corresponding pixel in the pathology image.
4. The method of clause 1 wherein the plurality of modes of quantization include color quantization, texture quantization and diagnostic quantization.
5. The method of clause 4 wherein the color quantization is implemented by first learning a Gaussian Mixture Model (GMM) from all pixels in a set of training images, then, based on the GMM, mapping each pixel in the pathology image to a Gaussian kernel label to which a color of the pixel has maximum posterior probability.
6. The method of clause 5 wherein the texture quantization is implemented by transforming each pixel of the pathology image into a filter response vector by filtering the pathology image with a set of predefined filters and quantizing the filter response vector against the GMM, which was learned from filter response vectors computed on the set of training images.
7. The method of clause 4 wherein the diagnostic quantization is implemented by assigning a label indicating a most probable cancer stage to each pixel in the pathology image using an automatic cancer grading analysis system.
8. The method of clause 1 wherein the quantization maps are converted into feature vectors by aggregating quantization labels.
9. The method of clause 1 wherein the feature vector comprises a histogram of labels.
10. The method of clause 1 wherein the feature vector also comprises multiple co-occurrence feature vectors, deduced from co-occurrence matrices computed at multiple scales.
11. The method of clause 1 wherein a pyramid of images of different resolutions are generated from the input pathology image, and the feature extraction procedure is repeated at each resolution, and the final feature vector is the concatenation of feature vectors computed at all resolutions.
12. A system programmed in a memory of a device comprising:
   a. a mode module configured for performing a plurality of modes of quantization on a pathology image;
   b. an extraction module configured for extracting features from quantization maps of the pathology image; and
   c. a generation module configured for generating a feature vector of the pathology image.
13. The system of clause 12 wherein the pathology image is quantized into a group of quantization maps corresponding to different quantization modules.
14. The system of clause 13 wherein each element of the quantization map comprises a quantization label of a corresponding pixel in the pathology image.
15. The system of clause 12 wherein the plurality of modes of quantization include color quantization, texture quantization and diagnostic quantization.
16. The system of clause 15 wherein the color quantization is implemented by first learning a Gaussian Mixture Model (GMM) from all pixels in a set of training images, then, based on the GMM, mapping each pixel in the pathology image to a Gaussian kernel label to which a color of the pixel has maximum posterior probability.
17. The system of clause 16 wherein the texture quantization is implemented by transforming each pixel of the pathology image into a filter response vector by filtering the pathology image with a set of predefined filters and quantizing the filter response vector against the GMM, which was learned from filter response vectors computed on the set of training images.
18. The system of clause 15 wherein the diagnostic quantization is implemented by assigning a label indicating a most probable cancer stage to each pixel in the pathology image using an automatic cancer grading analysis system.
19. The system of clause 12 wherein the quantization maps are converted into feature vectors by aggregating quantization labels.
20. The system of clause 12 wherein the feature vector comprises a histogram of labels.
21. The system of clause 12 wherein the feature vector also comprises multiple co-occurrence feature vectors, deduced from co-occurrence matrices computed at multiple scales.
22. The system of clause 12 wherein a pyramid of images of different resolutions are generated from the input pathology image, and the feature extraction procedure is repeated at each resolution, and the final feature vector is the concatenation of feature vectors computed at all resolutions.
23. An apparatus comprising:
   a. a non-transitory memory for storing an application, the application for:
      i. receiving a pathology image;
      ii. performing a plurality of modes of quantization on the pathology image;
      iii. extracting features from quantization maps of the pathology image; and
      iv. generating a feature vector of the pathology image; and
   b. a processing component coupled to the memory, the processing component configured for processing the application.
24. The apparatus of clause 23 wherein the pathology image is quantized into a group of quantization maps corresponding to different quantization modules.
25. The apparatus of clause 24 wherein each element of the quantization map comprises a quantization label of a corresponding pixel in the pathology image.
26. The apparatus of clause 23 wherein the plurality of modes of quantization include color quantization, texture quantization and diagnostic quantization.
27. The apparatus of clause 26 wherein the color quantization is implemented by first learning a Gaussian Mixture Model (GMM) from all pixels in a set of training images, then, based on the GMM, mapping each pixel in the pathology image to a Gaussian kernel label to which a color of the pixel has maximum posterior probability.
28. The apparatus of clause 27 wherein the texture quantization is implemented by transforming each pixel of the pathology image into a filter response vector by filtering the pathology image with a set of predefined filters and quantizing the filter response vector against the GMM, which was learned from filter response vectors computed on the set of training images.

29. The apparatus of clause 26 wherein the diagnostic quantization is implemented by assigning a label indicating a most probable cancer stage to each pixel in the pathology image using an automatic cancer grading analysis system.

30. The apparatus of clause 23 wherein the quantization maps are converted into feature vectors by aggregating quantization labels.

31. The apparatus of clause 23 wherein the feature vector comprises a histogram of labels.

32. The apparatus of clause 23 wherein the feature vector also comprises multiple co-occurrence feature vectors, deduced from co-occurrence matrices computed at multiple scales.

33. The apparatus of clause 23 wherein a pyramid of images of different resolutions are generated from the input pathology image, and the feature extraction procedure is repeated at each resolution, and the final feature vector is the concatenation of feature vectors computed at all resolutions.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of extracting a feature of an image programmed in a memory of a device comprising:
    a. receiving a pathology image;
    b. performing a plurality of modes of quantization on the pathology image, wherein the plurality of modes of quantization include color quantization, texture quantization and diagnostic quantization, wherein the diagnostic quantization is implemented by assigning a label indicating a most probable cancer stage to each pixel in the pathology image using an automatic cancer grading analysis system;
    c. extracting features from quantization maps of the pathology image, wherein each quantization map of the quantization maps is an integer array of a size equal to the pathology image; and
    d. generating a feature vector of the pathology image, wherein the feature vector comprises multiple co-occurrence feature vectors, deduced from co-occurrence matrices computed at multiple scales, wherein an offset distance parameter is used to determine a scale at which pixel correlation is analyzed.

2. The method of claim 1 wherein the pathology image is quantized into a group of quantization maps corresponding to different quantization modules.

3. The method of claim 2 wherein each element of the quantization maps comprises a quantization label of a corresponding pixel in the pathology image.

4. The method of claim 1 wherein the color quantization is implemented by first learning a Gaussian Mixture Model (GMM) from all pixels in a set of training images, then, based on the GMM, mapping each pixel in the pathology image to a Gaussian kernel label to which a color of the pixel has maximum posterior probability.

5. The method of claim 4 wherein the texture quantization is implemented by transforming each pixel of the pathology image into a filter response vector by filtering the pathology image with a set of predefined filters and quantizing the filter response vector against the GMM, which was learned from filter response vectors computed on the set of training images.

6. The method of claim 1 wherein the quantization maps are converted into feature vectors by aggregating quantization labels.

7. The method of claim 1 wherein the feature vector comprises a histogram of labels.

8. The method of claim 1 wherein a pyramid of images of different resolutions are generated from the input pathology image, and the feature extraction procedure is repeated at each resolution, and the final feature vector is the concatenation of feature vectors computed at all resolutions.

9. A system comprising:
    a. a non-transitory memory for storing an application, the application comprising:
        i. a mode module configured for performing a plurality of modes of quantization on a pathology image, wherein the plurality of modes of quantization include color quantization, texture quantization and diagnostic quantization, wherein the diagnostic quantization is implemented by assigning a label indicating a most probable cancer stage to each pixel in the pathology image using an automatic cancer grading analysis system;
        ii. an extraction module configured for extracting features from quantization maps of the pathology image, wherein each quantization map of the quantization maps is an integer array of a size equal to the pathology image; and
        iii. a generation module configured for generating a feature vector of the pathology image, wherein the feature vector comprises multiple co-occurrence feature vectors, deduced from co-occurrence matrices computed at multiple scales, wherein an offset distance parameter is used to determine a scale at which pixel correlation is analyzed; and
    b. a processor coupled to the memory, the processor configured for processing the application.

10. The system of claim 9 wherein the pathology image is quantized into a group of quantization maps corresponding to different quantization modules.

11. The system of claim 10 wherein each element of the quantization maps comprises a quantization label of a corresponding pixel in the pathology image.

12. The system of claim 9 wherein the color quantization is implemented by first learning a Gaussian Mixture Model (GMM) from all pixels in a set of training images, then, based on the GMM, mapping each pixel in the pathology image to a Gaussian kernel label to which a color of the pixel has maximum posterior probability.

13. The system of claim 12 wherein the texture quantization is implemented by transforming each pixel of the pathology image into a filter response vector by filtering the pathology image with a set of predefined filters and quantizing the filter response vector against the GMM, which was learned from filter response vectors computed on the set of training images.

14. The system of claim 9 wherein the quantization maps are converted into feature vectors by aggregating quantization labels.

15. The system of claim 9 wherein the feature vector comprises a histogram of labels.

16. The system of claim 9 wherein a pyramid of images of different resolutions are generated from the input pathology image, and the feature extraction procedure is repeated at each resolution, and the final feature vector is the concatenation of feature vectors computed at all resolutions.

17. An apparatus comprising:
b. a non-transitory memory for storing an application, the application for:
   i. receiving a pathology image;
   ii. performing a plurality of modes of quantization on the pathology image, wherein the plurality of modes of quantization include color quantization, texture quantization and diagnostic quantization, wherein the diagnostic quantization is implemented by assigning a label indicating a most probable cancer stage to each pixel in the pathology image using an automatic cancer grading analysis system;
   iii. extracting features from quantization maps of the pathology image, wherein each quantization map of the quantization maps is an integer array of a size equal to the pathology image; and
   iv. generating a feature vector of the pathology image, wherein the feature vector comprises multiple co-occurrence feature vectors, deduced from co-occurrence matrices computed at multiple scales, wherein an offset distance parameter is used to determine a scale at which pixel correlation is analyzed; and
c. a processor coupled to the memory, the processor configured for processing the application.

18. The apparatus of claim 17 wherein the pathology image is quantized into a group of quantization maps corresponding to different quantization modules.

19. The apparatus of claim 18 wherein each element of the quantization maps comprises a quantization label of a corresponding pixel in the pathology image.

20. The apparatus of claim 17 wherein the color quantization is implemented by first learning a Gaussian Mixture Model (GMM) from all pixels in a set of training images, then, based on the GMM, mapping each pixel in the pathology image to a Gaussian kernel label to which a color of the pixel has maximum posterior probability.

21. The apparatus of claim 20 wherein the texture quantization is implemented by transforming each pixel of the pathology image into a filter response vector by filtering the pathology image with a set of predefined filters and quantizing the filter response vector against the GMM, which was learned from filter response vectors computed on the set of training images.

22. The apparatus of claim 17 wherein the quantization maps are converted into feature vectors by aggregating quantization labels.

23. The apparatus of claim 17 wherein the feature vector comprises a histogram of labels.

24. The apparatus of claim 17 wherein a pyramid of images of different resolutions are generated from the input pathology image, and the feature extraction procedure is repeated at each resolution, and the final feature vector is the concatenation of feature vectors computed at all resolutions.

* * * * *